(12) United States Patent
Blackwell

(10) Patent No.: US 6,208,352 B1
(45) Date of Patent: Mar. 27, 2001

(54) METHOD FOR THE COMPUTERIZED SOLUTION OF THE INTERSECTION OF POLYGONS

(75) Inventor: Bruce Hardy Blackwell, Nashua, NH (US)

(73) Assignee: General Dynamics Government Systems Corp., Needham, MA (US)

( * ) Notice: Subject to any disclaimer, the term of this patent is extended or adjusted under 35 U.S.C. 154(b) by 0 days.

(21) Appl. No.: 09/385,747

(22) Filed: Aug. 30, 1999

(51) Int. Cl.[7] .................................................. G06T 15/30

(52) U.S. Cl. ............................................ 345/434; 345/441

(58) Field of Search ..................................... 345/434, 441

(56) References Cited

U.S. PATENT DOCUMENTS

| | | | |
|---|---|---|---|
| 4,805,127 | * | 2/1989 | Hata et al. ............................ 364/521 |
| 5,048,099 | * | 9/1991 | Lee ........................................ 382/22 |
| 5,129,051 | * | 7/1992 | Cain ..................................... 395/133 |
| 5,371,840 | * | 12/1994 | Fisher et al. ......................... 395/133 |

* cited by examiner

Primary Examiner—Mark R. Powell
Assistant Examiner—G. F. Cummingham
(74) Attorney, Agent, or Firm—Jenner & Block, LLC

(57) ABSTRACT

Methods and systems for the computerized solution of the intersection of polygons where the product polygon and subtracting polygon are represented by vertices in a product polygon linked list and a subtracting polygon linked list, respectively. In one aspect, the vertices in the product polygon linked list and the vertices in the subtracting polygon linked list have a different orientation.

16 Claims, 16 Drawing Sheets

METHOD FOR THE COMPUTERIZED SOLUTION OF THE INTERSECTION OF POLYGONS

BACKGROUND OF THE INVENTION

The present invention relates to computer graphics, and more particularly, to systems and methods for the computerized solution of the intersection of polygons.

Current systems focus on the interior of a polygon and employ rasterized approximations to the target and intersecting polygons. The intersection is then produced by scanning the sets of polygons to produce a raster of the result. The perimeter of the resulting raster is then finally converted to a description of its perimeter.

One problem with known prior art systems, however, is that a raster is an approximate solution since the raster entails discrete sampling of the problem space. Increased accuracy can only be obtained by using a finer raster. In some cases the full mathematical precision of the solution cannot be obtained without encountering round-off difficulties with the computer representation of numbers. Using a raster approximation is also very slow and increases with the absolute size of the intersecting polygons.

SUMMARY OF THE INVENTION

Accordingly, the present invention is directed to methods and systems for the computerized solution of the intersection of polygons that substantially obviates the problems of the prior art.

In accordance with the purposes of the invention, as embodied and broadly described herein, the invention comprises a method for subtracting a first subtracting polygon from a product polygon, including determining an intersection of the first subtracting polygon and the product polygon, wherein the first subtracting polygon is represented by a plurality of vertices in a first subtracting polygon linked list and the product polygon is represented by a plurality of vertices in a product polygon linked list, inserting a first intersection node at the intersection in the product polygon linked list, inserting a second intersection node at the intersection in the first subtracting polygon linked list, and creating a new linked list. The new linked list is created by determining a first vertex in the product polygon linked list, adding vertices from the product polygon linked list to the new linked list until the first intersection node is encountered by following the product polygon linked list from the determined first vertex, if an intersection node is encountered, adding vertices from the first subtracting product polygon linked list to the new linked list until a third intersection node is encountered by following the first subtracting polygon linked list from the second intersection node, and repeating the above subsets until returned to the determined first vertex.

In another aspect the invention comprises an apparatus for subtracting a first subtracting polygon from a product polygon, including a memory for storing a program and a processor for running the program. The program is for determining an intersection of the first subtracting polygon and the product polygon, wherein the first subtracting polygon is represented by a plurality of vertices in a first subtracting polygon linked list and the product polygon is represented by a plurality of vertices in a product polygon linked list, inserting a first intersection node at the intersection in the product polygon linked list, inserting a second intersection node at the intersection in the first subtracting polygon linked list, and creating a new linked list. The new linked list is created by determining a first vertex in the product polygon linked list, adding vertices from the product polygon linked list to the new linked list until the first intersection node is encountered by following the product polygon linked list from the determined first vertex, if an intersection node is encountered, adding vertices from the first subtracting product polygon linked list to the new linked list until a third intersection node is encountered by following the first subtracting polygon linked list from the second intersection node, repeating the above substeps until returned to the determined first vertex.

In another aspect the invention comprises a computer-readable medium whose contents cause a computer system to subtract a first subtracting polygon from a product polygon, by performing the steps of determining an intersection of the first subtracting polygon and the product polygon, wherein the first subtracting polygon is represented by a plurality of vertices in a first subtracting polygon linked list and the product polygon is represented by a plurality of vertices in a product polygon linked list, inserting a first intersection node at the intersection in the product polygon linked list, inserting a second intersection node at the intersection in the first subtracting polygon linked list, and creating a new linked list. The new linked list is created by determining a first vertex in the product polygon linked list, adding vertices from the product polygon linked list to the new linked list until the first intersection node is encountered by following the product polygon linked list from the determined first vertex, if an intersection node is encountered, adding vertices from the first subtracting product polygon linked list to the new linked list until a third intersection node is encountered by following the first subtracting polygon linked list from the second intersection node, and repeating the above subsets until returned to the determined first vertex.

This summary of the invention and the following detailed description should not restrict the scope of the claimed invention. Both provide examples and explanations to enable others to practice the invention. The accompanying drawings, which form part of the description for carrying out a best mode of the invention, show several embodiments of the invention, and together with the description, explain the principles of the invention.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
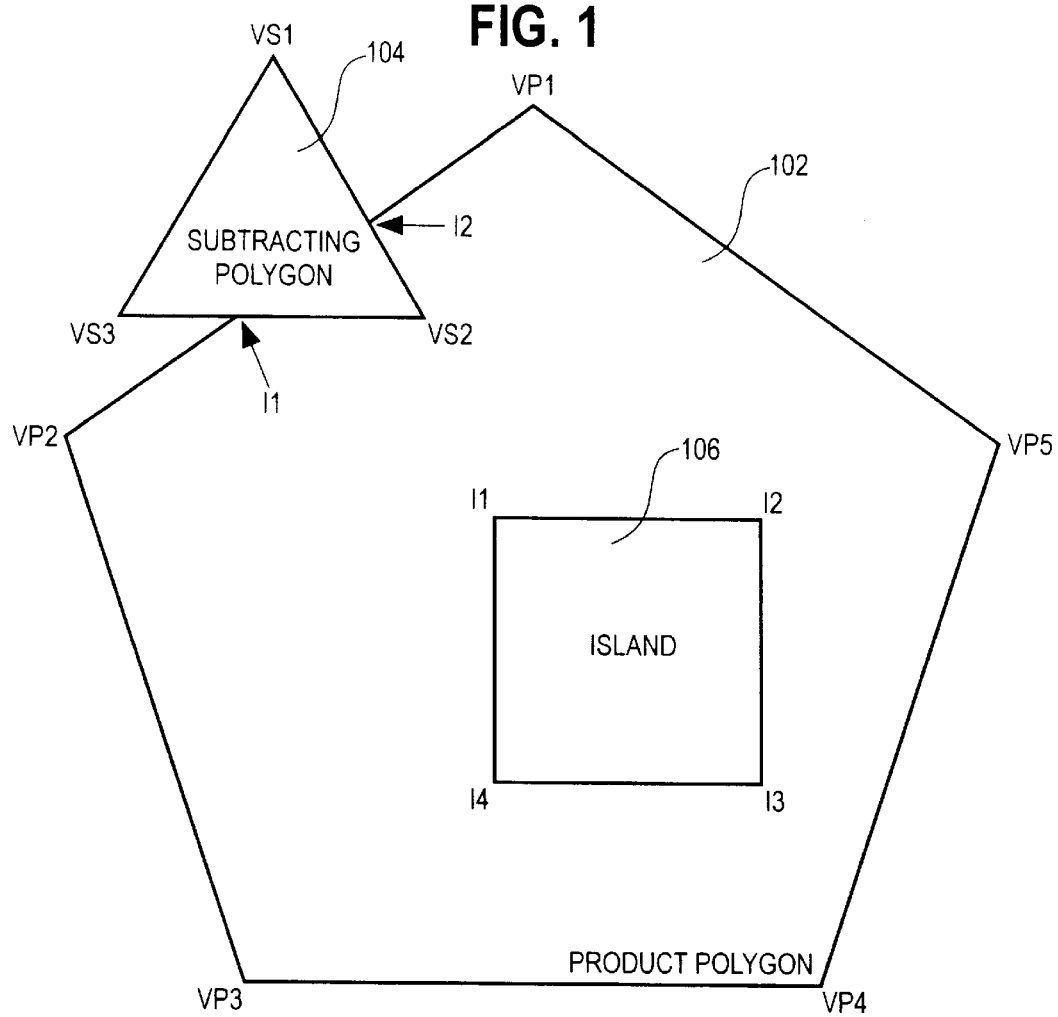
FIG. 1 illustrates a product polygon and a subtracting polygon that intersect and an island contained within the product polygon, in accordance with methods and systems consistent with the invention.
Figure 2:
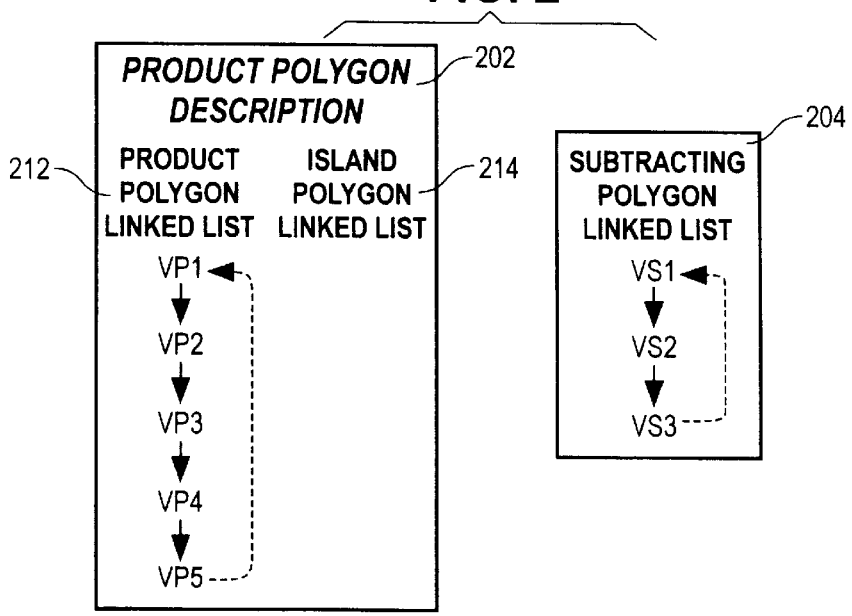
FIG. 2 provides an illustration of a product polygon description and a subtracting polygon linked list, in accordance with methods and systems consistent with the invention.

FIG. 1 illustrates a product polygon 102 and a subtracting polygon 104 that intersect and an island 106 contained within the product polygon 102. A product polygon is a polygon that will have a section of it subtracted or removed. A subtracting polygon is a polygon that removes a section from the product polygon. FIG. 2 provides an illustration of a product polygon description 202 for the product polygon 102, and a subtracting polygon linked list 204 for the subtracting polygon 104. As illustrated, the product polygon description 202 includes a linked list 212 of the vertices of the product polygon 102, and a linked list 214 for the vertices of the island 106. As illustrated, the vertices of the product polygon 102 are placed in the product polygon linked list 212 in a counter-clockwise order, while the vertices of both the subtracting polygon 104 and island polygon 106 are placed in the subtracting polygon linked list 204 and island polygon linked list 214, respectively, in a clockwise direction. Well known algorithms for the computation of the polygon area may be used for determining the vertex ordering, since negative areas will be returned for clockwise polygons.

Figure 3:
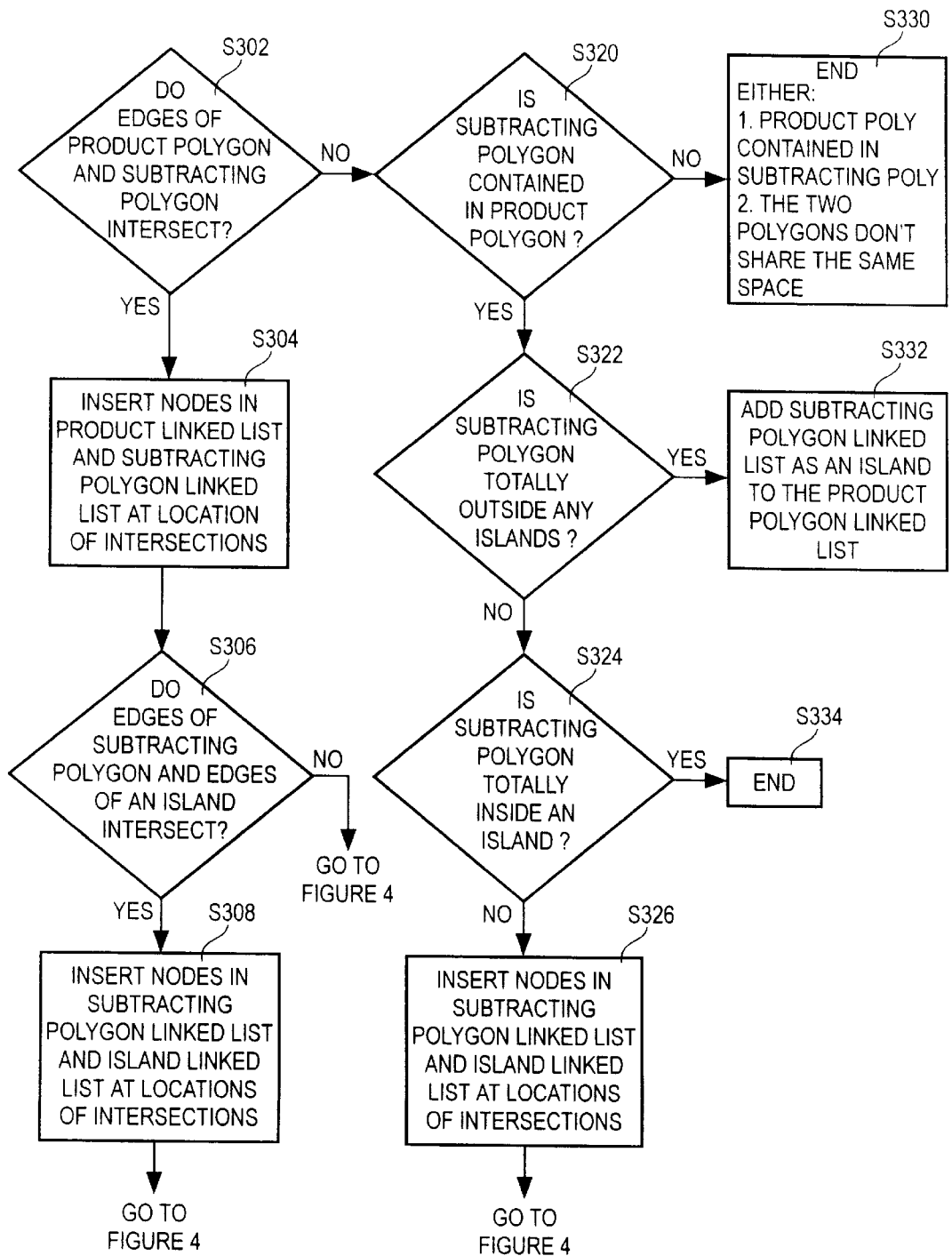
FIG. 3 illustrates a flow chart of a method for computing the intersection of two polygons, in accordance with methods and systems consistent with the invention.

FIG. 3 illustrates a flow chart of a method for computing the intersection of two polygons according to a preferred embodiment. The first step is determining if any edges of the subtracting polygon intersect the product polygon (S302). If an intersection is found, the next step is inserting nodes into the product polygon linked list and the subtracting polygon linked list at the intersection locations (S304). The next step is determining if the edges of the subtracting polygon intersect with any islands in the product polygon (S306). If not, the procedure proceeds to the steps illustrated in FIG. 4.

Figure 4:
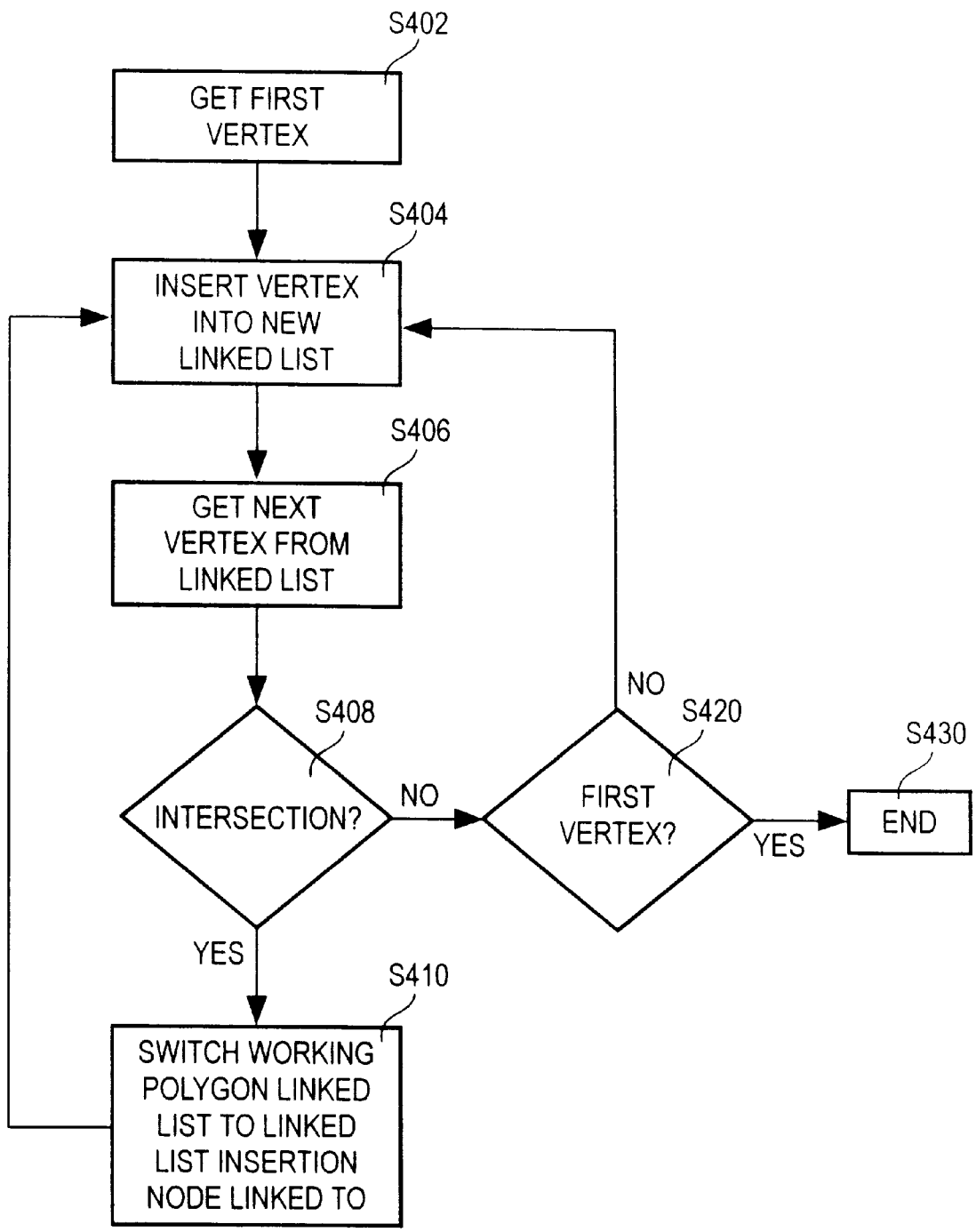
FIG. 4 illustrates a flow chart of a method for determining a new polygon linked list once an intersection is found, in accordance with methods and systems consistent with the invention.

FIG. 4 provides an illustration of a process for determining a new polygon linked list once an intersection is found. The first step is obtaining the first vertex in the product polygon description that is (1) outside the subtracting polygon or an intersection vertex with the subtracting polygon and (2) has not been used already to build a polygon chain (S402). Next, a new linked list is created beginning with this vertex (S404). Then the next vertex or node in the linked list is obtained (S406). This vertex or node is then checked to determine if it is an intersection (S408). If not, the vertex is checked to see if the process has returned to the vertex the chain was started with (S420). If not, then the obtained vertex is inserted into the new linked list (S404) and the process is continued until an intersection is determined or the starting vertex is obtained.

When an intersection is located, the operation switches to the polygon with the insertion node that is linked to the intersection node that was just processed (S410). Operations then proceed beginning at the intersection node in this polygon linked list. The intersection node is inserted into the new linked list (S404). Next, the vertex or node following the intersection node is obtained (S406). This vertex or node is then checked to determine if it is an intersection. If not, it is inserted into the new linked list (S404), and the process is continued until another intersection is found. When an intersection is found, operation is again switched to the polygon with the insertion node that is linked to this insertion node (S410) and the intersection node is inserted into the new linked list (S404).

The process is then continued until the process returns to the vertex used to start the new product polygon linked list. This new linked list then replaces the original product polygon linked list. If, however, there are still vertices that are both (1) outside the subtracting polygon or an intersection with the subtracting polygon and (2) have not been used already to build a polygon chain, the process is returned to step (S402).

Referring back to FIG. 3, if it is determined that the product polygon and subtracting polygon do not intersect (S302), the next step is determining if the subtracting polygon is contained in the product polygon (S320). If not, the method is terminated because either the product polygon is wholly contained in the subtracting polygon and no further subtracting polygons need to be processed, or the subtracting polygon and product polygon do not share any common space (S330).

If it is determined that the product polygon and the subtracting polygon do not intersect but that the subtracting polygon is contained within the product polygon, the next step is determining whether the subtracting polygon is totally outside any islands (S322). If so, the subtracting polygon linked list is added to the product polygon description as an island (S332). Otherwise, the next step is determining whether the product polygon is completely inside an island (S324). If so, the process is terminated as the area subtracted by the subtracting polygon has already been subtracted from the product polygon (S334). If the subtracting polygon is not totally within an island, then the island and the subtracting polygon intersect. Thus, the next step is inserting in the island linked list and the subtracting polygon linked list nodes at the intersection locations (S326). After which, the subtracting polygon is added to the island by following the same basic procedure as illustrated in FIG. 4.

Thus, the next step is determining the first vertex in the island that is (1) outside the subtracting polygon or an intersection vertex with the subtracting polygon and (2) has not been used already to build a polygon chain (S402). Next, a new island linked list is created beginning with the determined vertex (S404). Then, the next vertex or node in the island linked list is obtained (S406). This vertex or node is then checked to determine if it is an intersection (S408). If not, then it is checked to see if it is the vertex the new linked list was started with (S420). If not, the obtained vertex is inserted into the new linked list (S404) and the process is continued until an intersection is determined or returned to the starting vertex.

When an intersection is located, the operation switches to the subtracting polygon (S410). The intersection node is then inserted into the new linked list (S404). Next, the vertex or node following the intersection is obtained (S406). This vertex or node is then checked to determine if it is an intersection (S408). If not, it is inserted into the new linked list (S404), and the process is continued until another intersection node is found. When an intersection is found, operation is switched back to the island polygon (S410) and the intersection is inserted into the new linked list (S404). This process is then continued until returned to the starting vertex in the new polygon linked list. This new linked list then becomes the island product polygon linked list with the subtracting polygon added to it. It should be noted that the subtracting polygon removes area from the product polygon, while the subtracting polygon adds area to an island. The same above described procedure can be used for both situations due to the ordering of the vertices in the product polygon linked list in a counter-clockwise orientation and the ordering of the vertices in the subtracting polygon and island polygon linked lists in a clockwise orientation.

Figure 5:
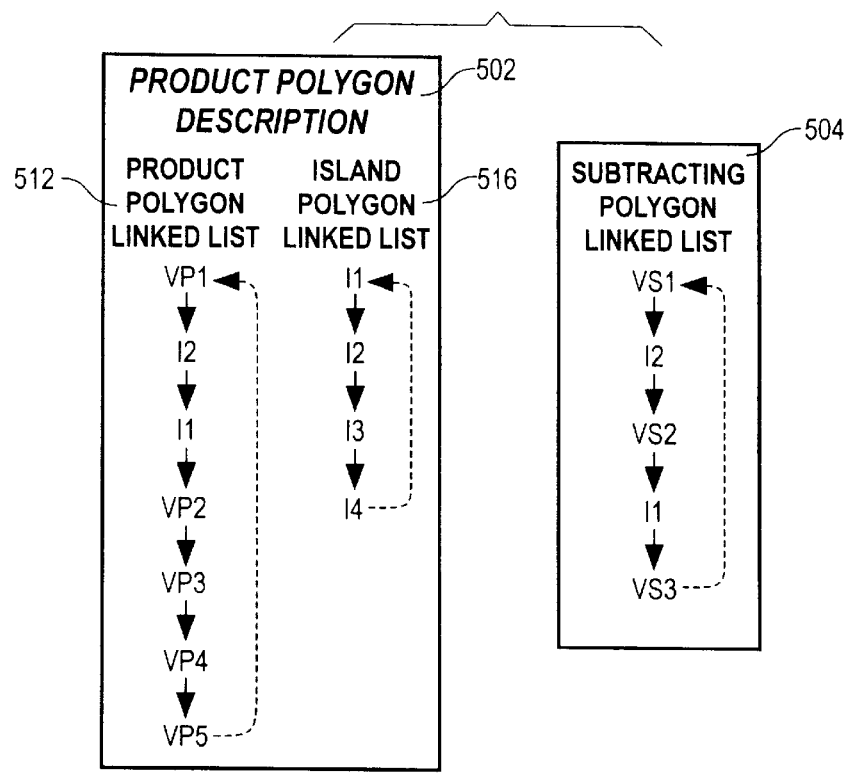
FIG. 5 provides a logical illustration of a product polygon description and a subtracting polygon linked list after nodes are inserted, in accordance with methods and systems consistent with the invention.

Referring back to FIG. 1, an example of how this procedure may be applied will be explained. The first step is determining whether the product polygon and the subtracting polygon intersect (S302). In this case an intersection is found. Thus, the next step is inserting into the product polygon linked and the subtracting polygon linked list nodes at the intersection locations (S304). FIG. 5 provides a logical illustration of the product polygon linked list 512 and the subtracting polygon linked list 504 after the nodes are inserted. Next, it is determined whether or not the subtracting polygon intersects with an island (S306). In this case, no intersection is found.

Figure 6:
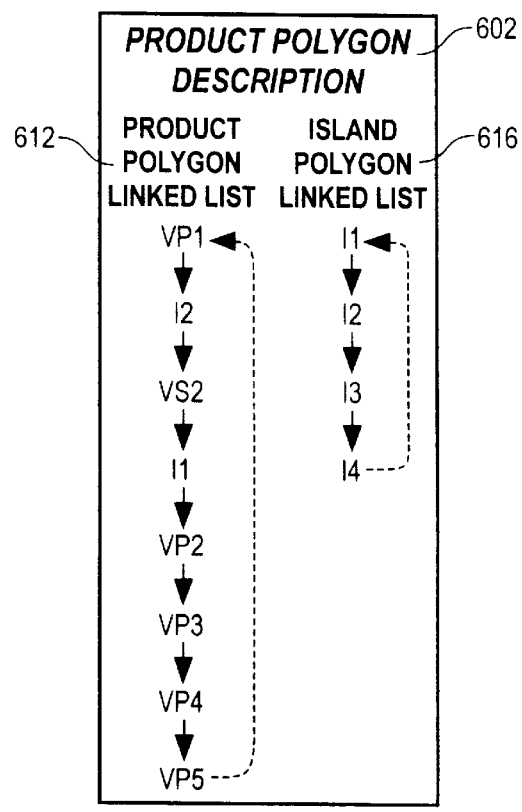
FIG. 6 provides a logical illustration of a product polygon description, in accordance with methods and systems consistent with the invention.
Figure 7:
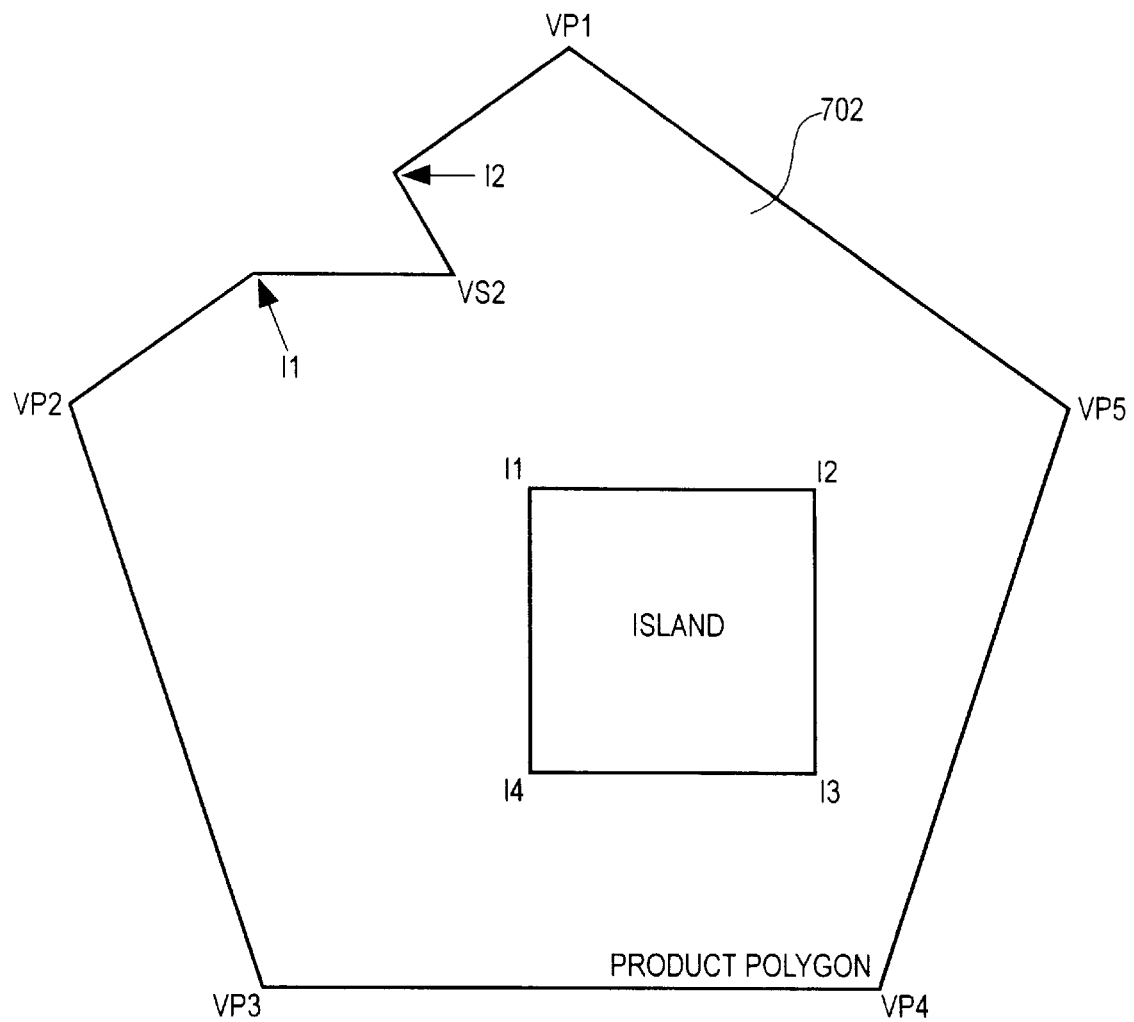
FIG. 7 provides an illustration of a polygon, in accordance with methods and systems consistent with the invention.

Referring to FIG. 4, the next step is determining the first vertex in the product polygon linked list that is (1) outside the subtracting polygon or an intersection vertex with the subtracting polygon and (2) has not been used already to build a polygon chain (S402). In this case the first vertex, VP1, meets this criteria. The next step is inserting this vertex into a new linked list (S404). Then, the next vertex or node in the linked list is obtained (S406). In this case, the next node is 12. The next step is determining whether this is an intersection (S408). In this case it is an intersection, thus operation switches to the subtracting polygon (S410). The intersection I2 is then inserted into the new linked list (S404). The next vertex/node in the subtracting polygon linked list is then obtained (S406). In this case, this vertex is VS2. This vertex is then checked to see if it is an intersection, which in this case it is not (S408). Thus, VS2 is inserted into the new linked list (S404), and the next vertex/node is obtained (S406). In this case it is intersection node I1. Thus, operation switches back to the product polygon (S410). The intersection is then inserted into the new linked list (S404). This process is then repeated until the process returns to the vertex that was first inserted into the new linked list (S420). After which, the process is terminated and the new linked list replaces the original product polygon linked list 212 (S430). FIG. 6 provides a logical illustration of the product polygon linked list 612 after the subtracting polygon is subtracted from the product polygon. FIG. 7 provides an illustration of the product polygon 702 with the subtracting polygon subtracted from it.

Figure 8:
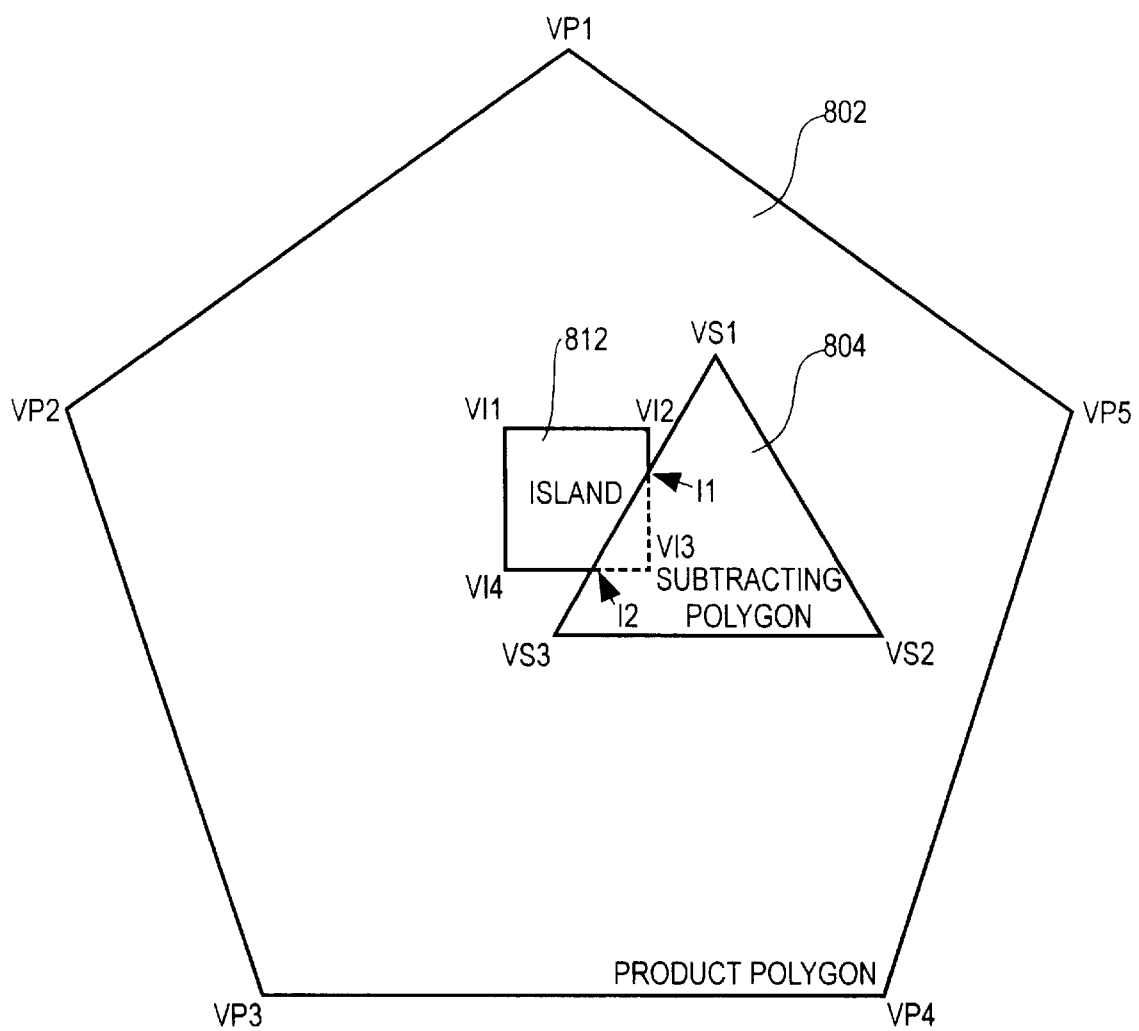
FIG. 8 provides an illustration of a product polygon with an island and a subtracting polygon, where the subtracting polygon is wholly contained within the product polygon and interests with the island, in accordance with methods and systems consistent with the invention.
Figure 9:
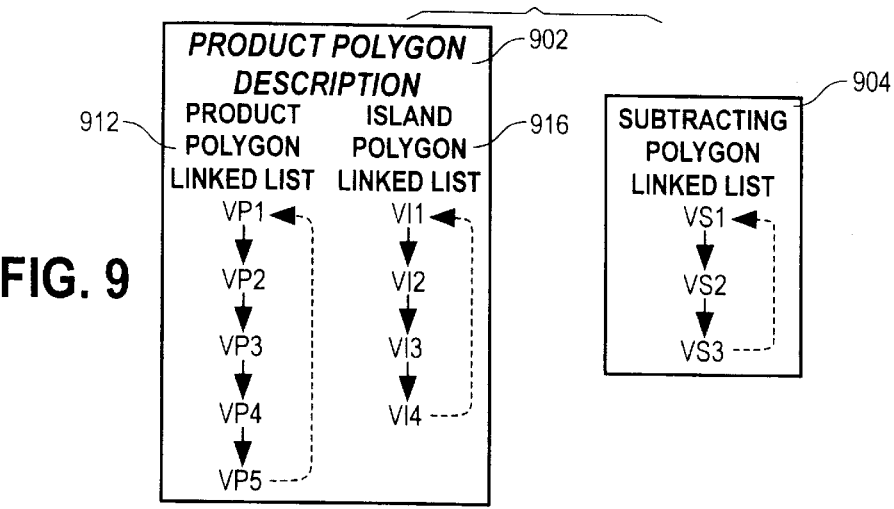
FIG. 9 provides a logical illustration of a product polygon description and a subtracting polygon linked list 904, in accordance with methods and systems consistent with the invention.

FIG. 8 provides an illustration of a product polygon 802 with an island 812 and a subtracting polygon 804, where the subtracting polygon 804 is wholly contained within the product polygon 802 and intersects with the island 812. FIG. 9 provides a logical illustration of a product polygon description 902 and a subtracting polygon linked list 904. The product polygon description includes a product polygon linked list 912 and an island polygon linked list 916.

Figure 10:
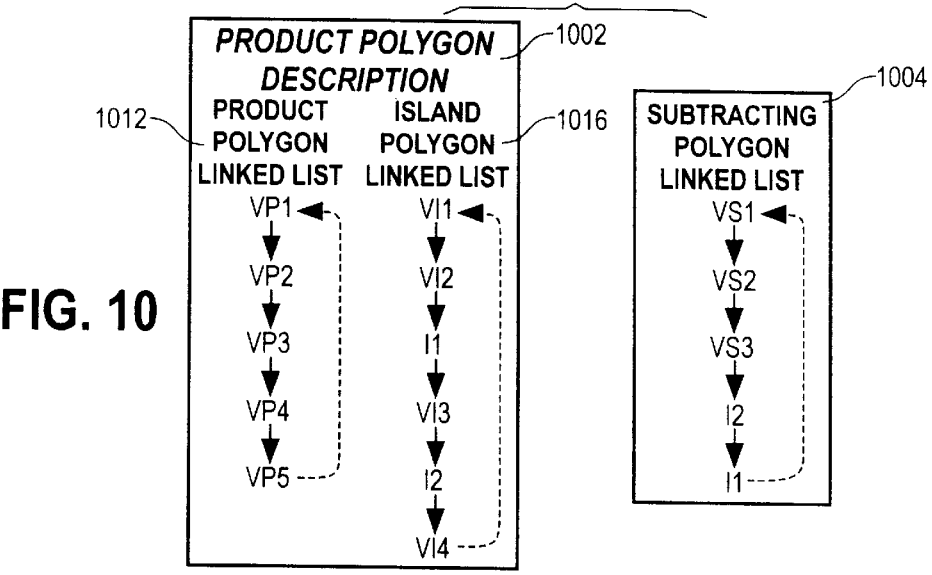
FIG. 10 provides an illustration of the product polygon description and a subtracting polygon linked list after intersection nodes are inserted, in accordance with methods and systems consistent with the invention.

Referring back to FIG. 3, the first step is determining whether the product polygon and subtracting polygon intersect (S302). Because they do not, the next step is determining whether the subtracting polygon is wholly contained within the product polygon (S320). Because it is, the next step is determining whether the subtracting polygon is completely outside any islands (S322). Because it is not, the next step is determining whether the subtracting polygon is wholly contained within an island (S324). Because it is not, the next step is inserting nodes at the intersection locations into the subtracting polygon and island polygon linked lists (S326). FIG. 10 provides an illustration of the product polygon description 1002 and subtracting polygon linked list 1004 after the intersection nodes are inserted.

Figure 11:
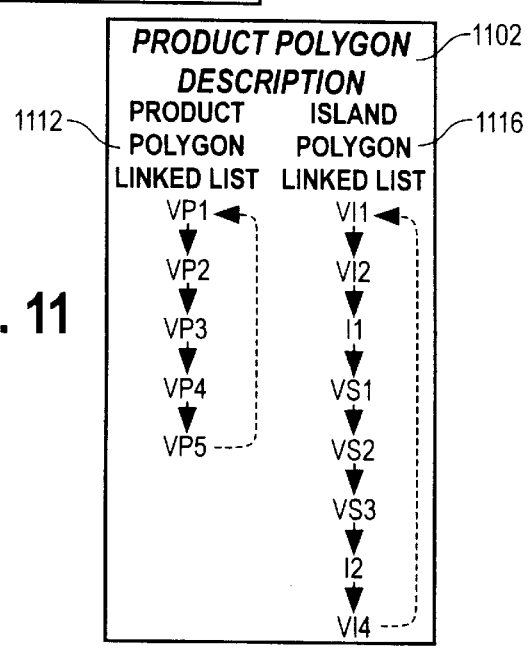
FIG. 11 provides an illustration of a product polygon description, in accordance with methods and systems consistent with the invention.
Figure 12:
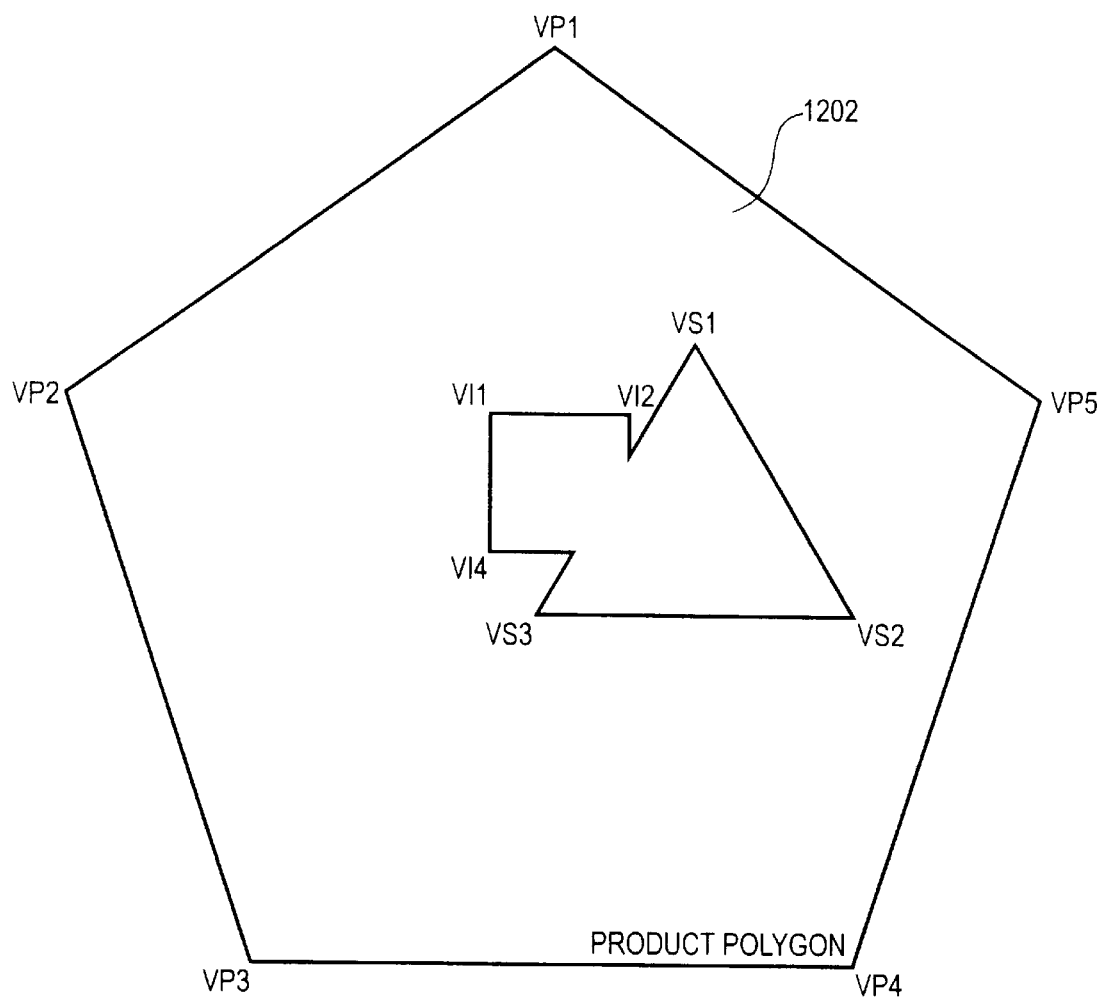
FIG. 12 provides an illustration of a polygon, in accordance with methods and systems consistent with the invention.

Referring back to FIG. 4, the next step is determining the first vertex in the island polygon linked list that is outside the subtracting polygon (S402). It should be noted that due to the nature of islands, a vertex of an island cannot be used to create another vertex chain once it has been used to create a vertex chain, and thus it is not necessary to check if it has already been used to create a vertex chain. In this case the determined island vertex is VI1. The next step is placing this vertex into a new island linked list (S404). After which, the next vertex/node in the island linked list is obtained (S406) and checked to see if it is an intersection (S408). If not, this process is continued until an intersection is located, at which point operation switches to the subtracting polygon (S410) and the intersection node is inserted into the new island linked list (S404). The next vertex/node in the subtracting polygon linked list is obtained (S406), checked to see if it is an intersection (S408), and if not, inserted into the new island linked list. This process is then continued until an intersection is located, at which point operation switches back to the island polygon. This overall procedure is then repeated until it returns to the starting vertex (S420). FIG. 11 provides an illustration of the product polygon description 1102 after this process is completed. As shown, the product polygon linked list 1112 is unchanged while the island polygon linked list 1116 now includes the new area from the subtracting polygon 804. FIG. 12 provides an illustration of the product polygon 1202 with the subtracting polygon subtracted from it.

Figure 13:
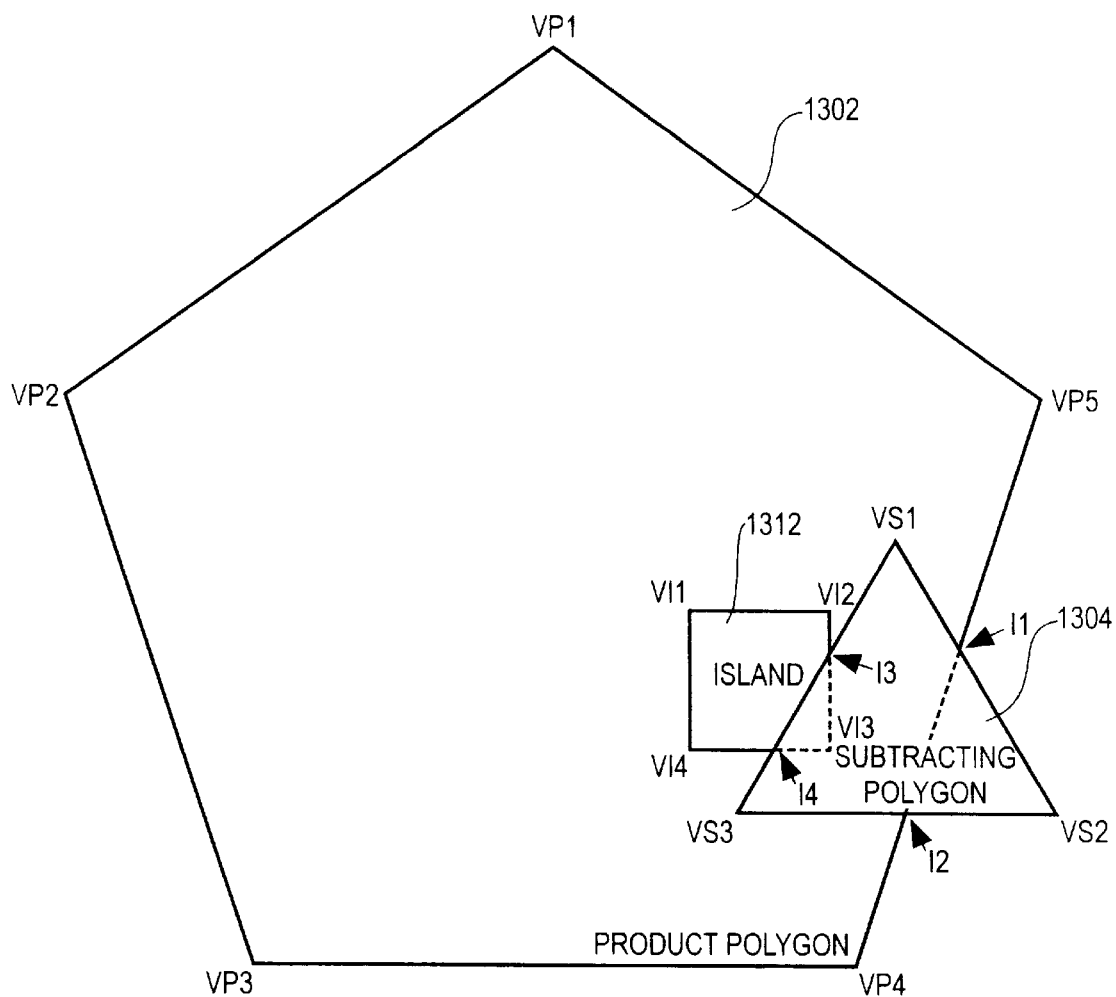
FIG. 13 provides an illustration of a product polygon with an island and a subtracting polygon where the subtracting polygon intersects with both the product polygon and the island, in accordance with methods and systems consistent with the invention.
Figure 14:
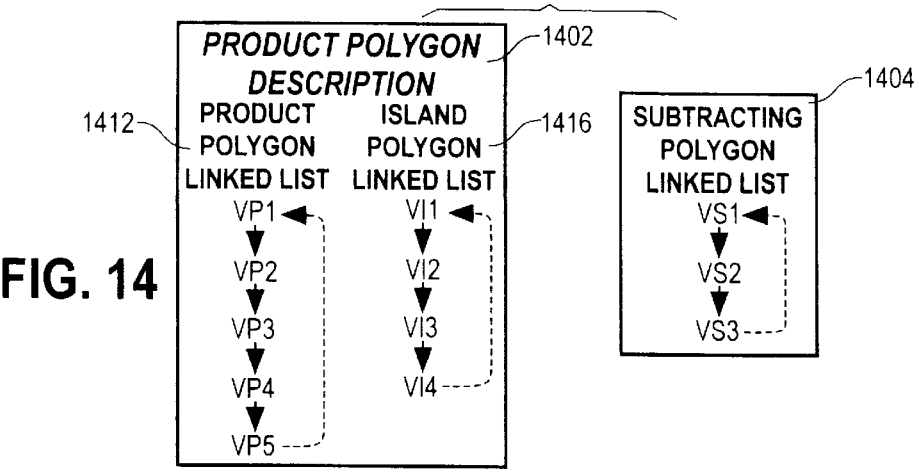
FIG. 14 illustrates a logical description of a product polygram description and a subtracting polygram linked list, in accordance with methods and systems consistent with the invention.
Figure 15:
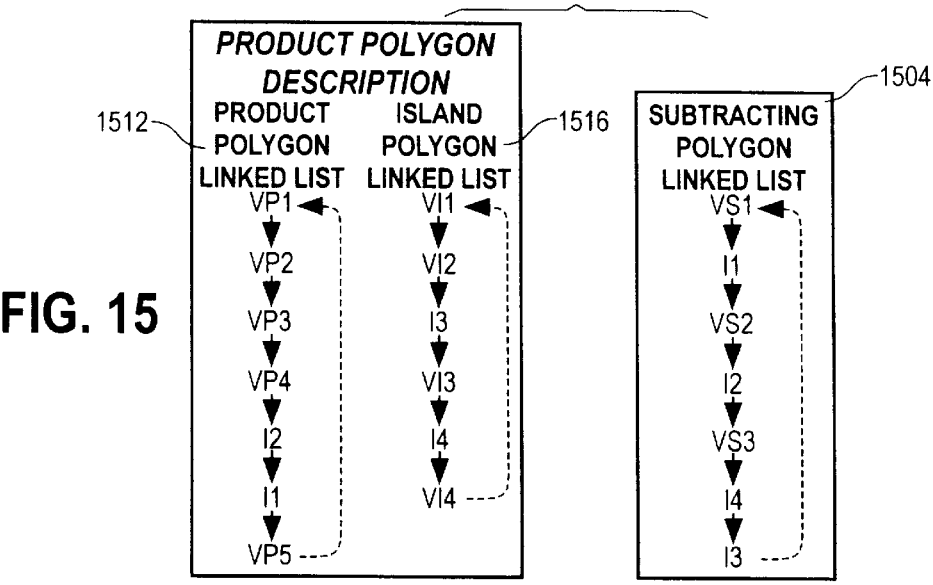
FIG. 15 provides a logical diagram of a product polygon description and a subtracting polygon linked list with intersection nodes inserted, in accordance with methods and systems consistent with the invention.

FIG. 13 provides an illustration of a product polygon 1302 with an island 1312 and a subtracting polygon 1304 where the subtracting polygon 1304 intersects with both the product polygon 1302 and the island 1312. FIG. 14 illustrates a logical description of the product polygon description 1402 and subtracting polygon linked list 1404. The product polygon description contains a product polygon linked list 1412 and an island polygon linked list 1416. Referring back to FIG. 3, the first step is determining if any of the edges of the product polygon intersect with the subtracting polygon (S302), which in this case they do. The next step is then inserting nodes at the intersection locations into both the subtracting polygon linked list and the product polygon linked list (S304). Thus, nodes I1 and I2 are inserted into the linked lists of the two polygons at these locations. Next, it is determined whether the edges of the subtracting polygon intersect with an island (S306). Because they do, the next step is inserting nodes at the intersection locations into both the island polygon linked list and subtracting polygon linked list (S308). FIG. 15 provides a logical diagram of the product polygon linked list 1512, island polygon linked list 1516, and subtracting polygon linked list 1504 with the intersection nodes inserted.

Figure 16:
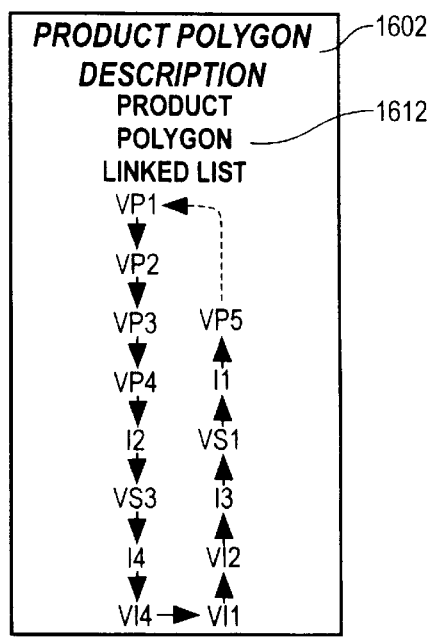
FIG. 16 provides a logical illustration of a product polygon description, in accordance with methods and systems consistent with the invention.
Figure 17:
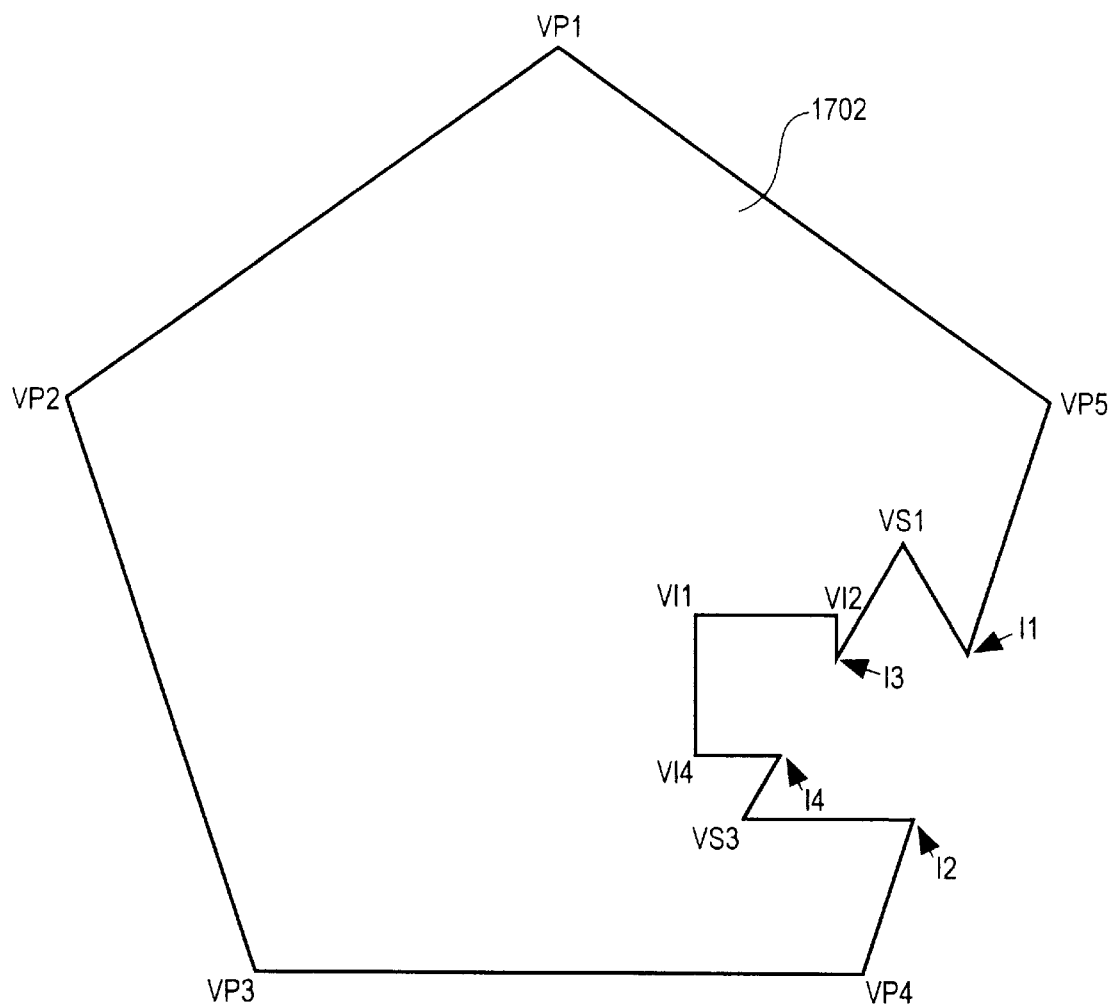
FIG. 17 provides an illustration of a polygon, in accordance with methods and systems consistent with the invention.

Referring back to FIG. 4, the next step is determining the first vertex in the product polygon linked list that is (1) outside the subtracting polygon or an intersection vertex with the subtracting polygon and (2) has not been used already to build a polygon chain (S402). In this case, this vertex is VP1. Next, vertex VP1 is inserted into a new linked list (S404). After which, the next vertex/node in the linked list is obtained (S406) and inserted into the new linked list (S404) until an intersection is found (S408). Thus, in this case, vertices VP1, VP2, VP3, and VP4 are inserted into the new linked list prior to coming across intersection node I2. When I2 is reached, operation is switched to the subtracting polygon because intersection node I2 of the product polygon linked list is linked to intersection node I2 in the subtracting polygon linked list (S410). Operations then continue from intersection node I2 in the subtracting polygon linked list 1504. Intersection I2 node is then inserted into the new linked list (S404). Then vertex VS3 of the subtracting polygon is obtained (S406) and inserted into the new linked list (S404). After which, intersection node I4 is obtained. This intersection node is linked with an intersection node in the island polygon linked list, so operation is switched to the island polygon linked list (S410) and intersection node I4 is inserted into the new linked list (S404). After which, vertex VI4 is obtained from the island polygon linked list (S406) and inserted into the new linked list (S404). Next, the process is repeated and vertices VI1 and VI2 are inserted into the new linked list. After which, intersection node I3, which is linked with intersection node I3 in the subtracting polygon linked list is obtained. Thus, operation is switched back to the subtracting polygon linked list (S410) and intersection node I3 is inserted into the new linked list (S404). Next, vertex VS1 is obtained (S406) and inserted into the new linked list (S404). After which, intersection node I1 is obtained (S406) and operation is switched back to the product polygon (S410) where vertex VP5 is inserted into the new linked list (S404). This is the final vertex before returning to the starting vertex V1 (S420). Thus, the process is terminated and the product polygon linked list and island polygon linked lists are replaced with the new linked list which is now labeled as the product polygon linked list. FIG. 16 provides a logical illustration of the resulting product polygon description 1602 and product polygon linked list 1612. FIG. 17 provides an illustration of the resulting product polygon 1702.

Figure 18:
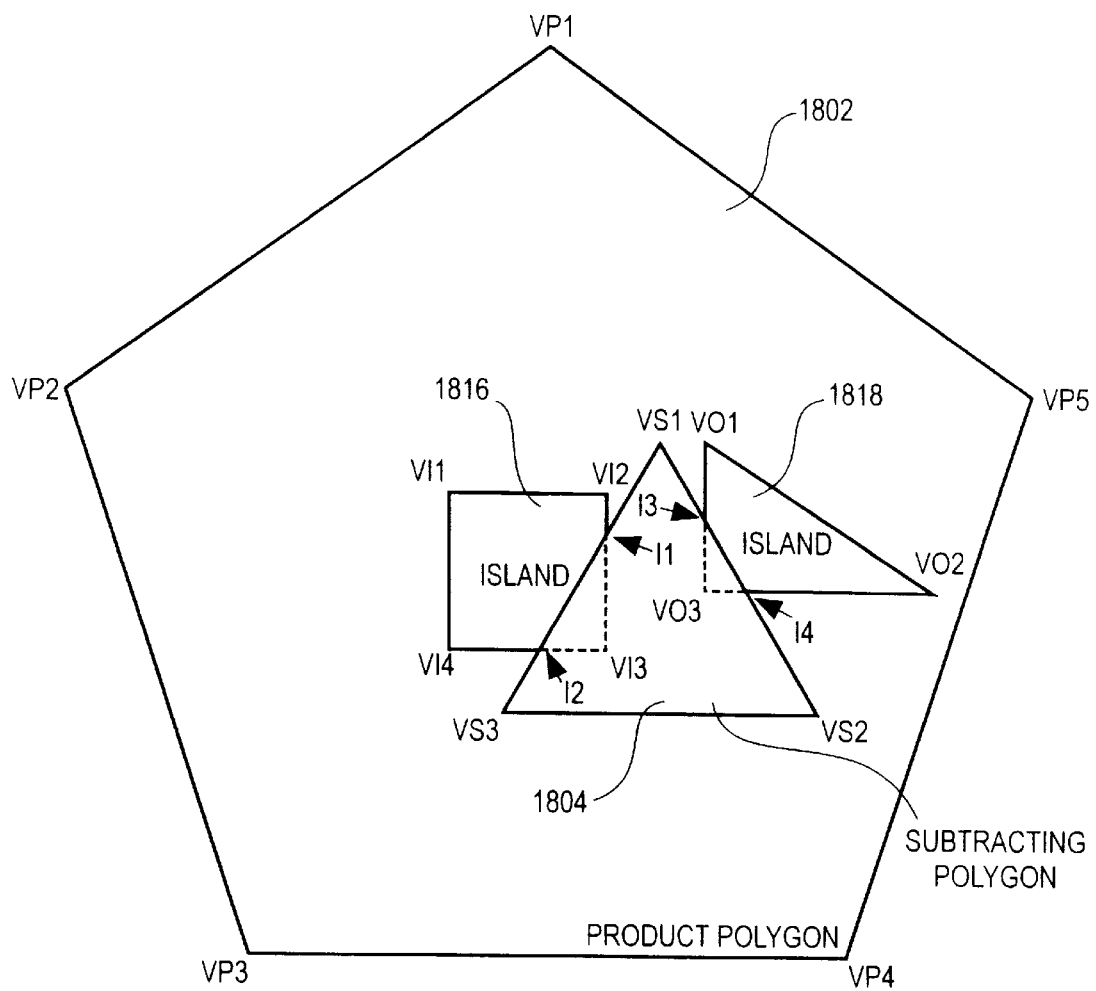
FIG. 18 provides an illustration of a subtracting polygon and a product polygon with two islands, in accordance with methods and systems consistent with the invention.
Figure 19:
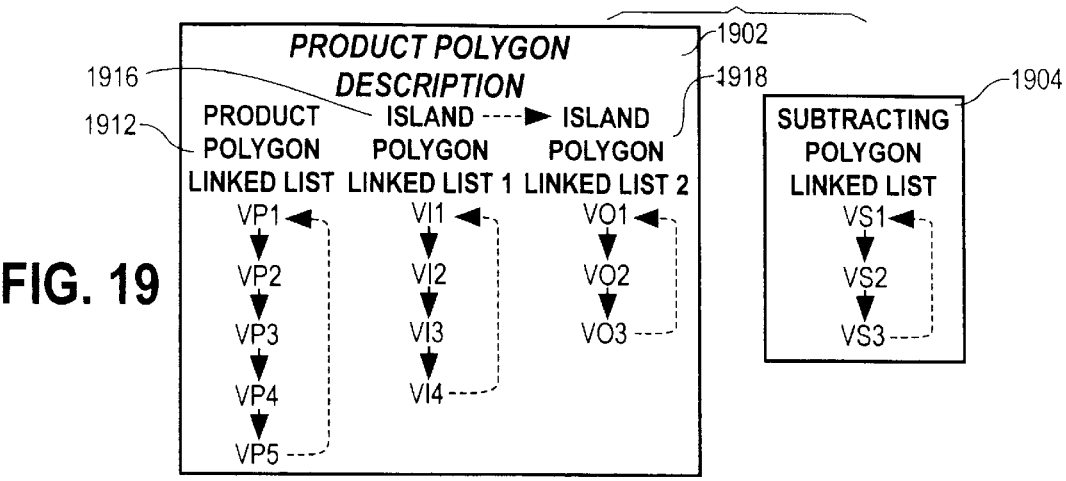
FIG. 19 provides a logical illustration of a product polygon description and a subtracting polygon linked list, in accordance with methods and systems consistent with the invention.
Figure 20:
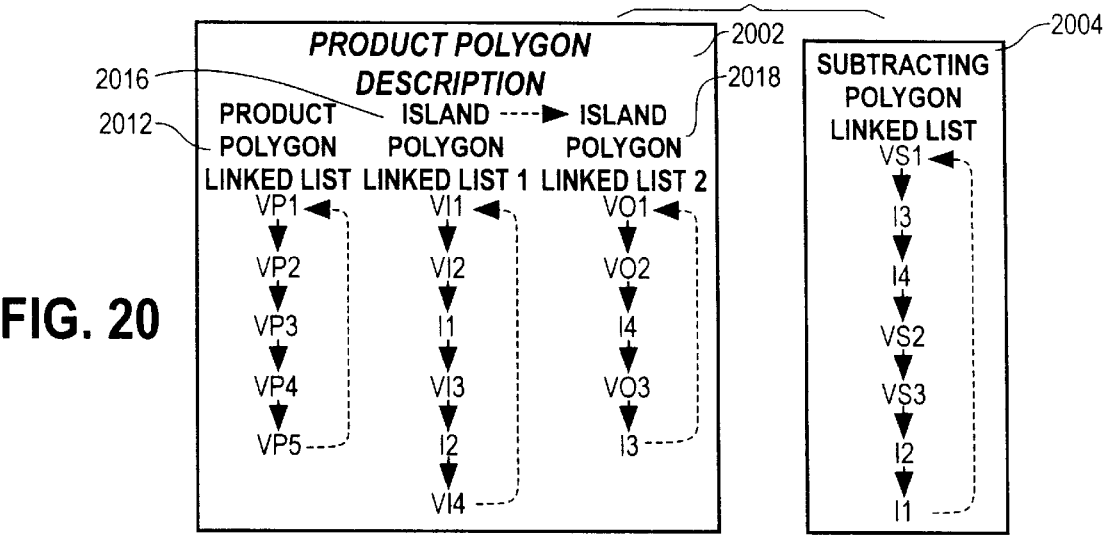
FIG. 20 provides a logical illustration of a product polygon description and a subtracting polygon linked list after intersection nodes are inserted, in accordance with methods and systems consistent with the invention.
Figure 21:
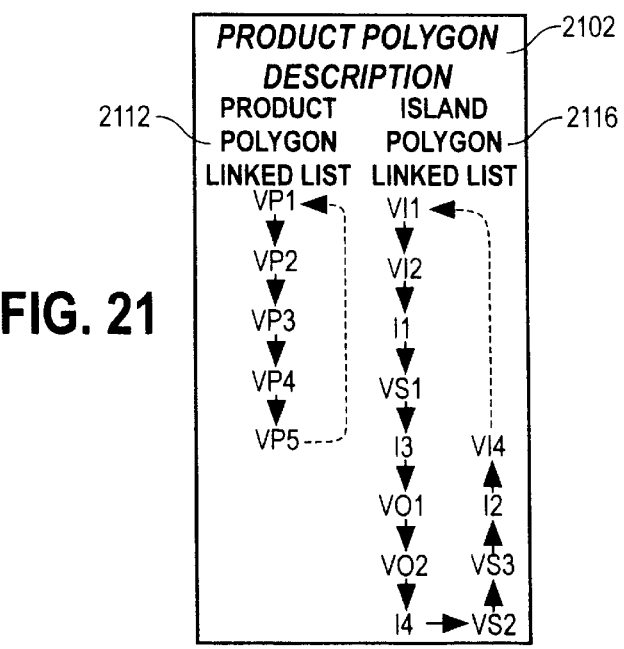
FIG. 21 provides a logical illustration of a product polygon description, in accordance with methods and systems consistent with the invention.
Figure 22:
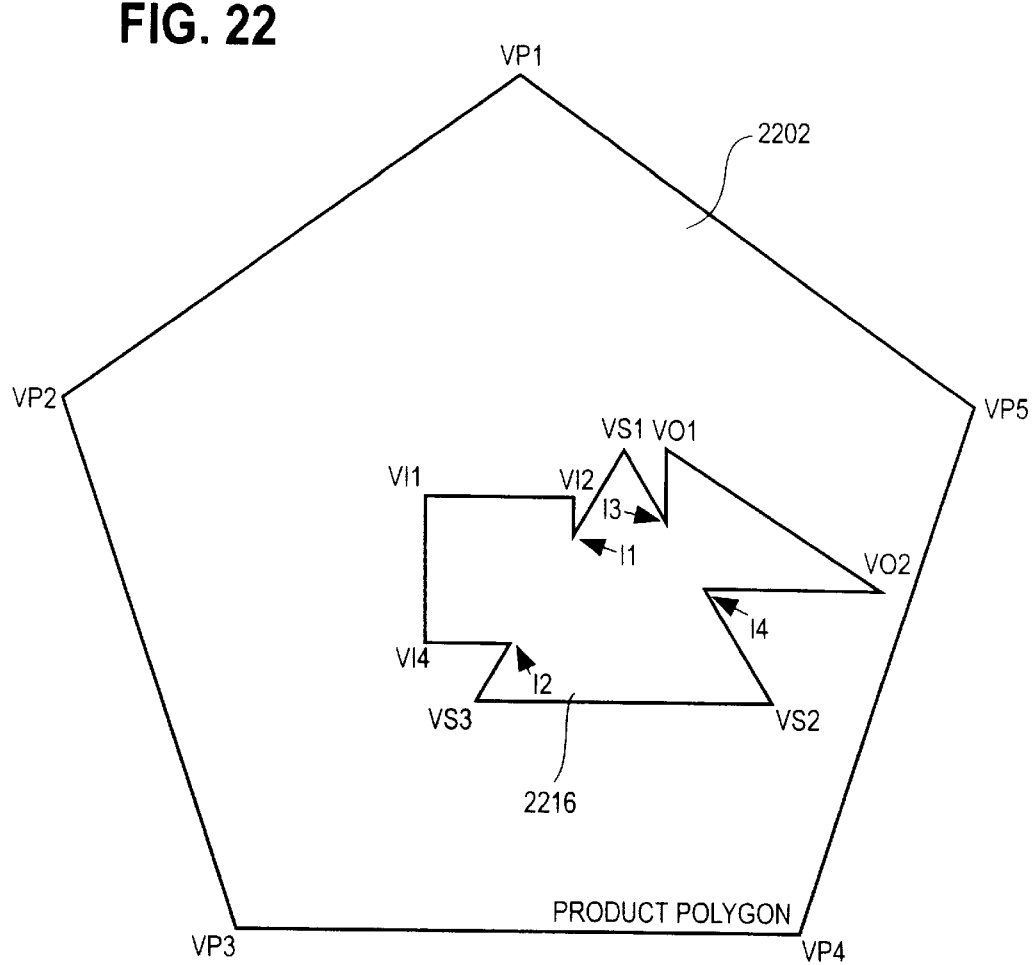
FIG. 22 provides an illustration of a polygon, in accordance with methods and systems consistent with the invention.

FIG. 18 provides an illustration of a subtracting polygon 1804 and a product polygon 1802 with two islands 1816 and 1818. As illustrated, subtracting polygon 1804 is wholly contained in the product polygon 1802 and intersects with both island 1816 and island 1818. FIG. 19 provides a logical illustration of the product polygon description 1902 and the subtracting polygon linked list 1904. Product polygon description 1902 includes a product polygon linked list 1912, an island polygon linked list 1916 for the first island 1816, and an island polygon linked list 1918 for the second island 1818. FIG. 20 provides a logical illustration of the resulting linked lists after the intersection nodes are placed in the linked lists. As shown, intersection nodes I1 and I2 are placed into island linked list 2016, intersection nodes I4 and I3 are placed into island polygon linked list 2018, and intersection nodes I1, I2, I3, and I4 are placed into subtracting polygon linked list 2004 at their respective intersection locations. The product polygon linked list 2012 remains unchanged. The procedure outlined in FIG. 4 and discussed above is then followed. FIG. 21 provides a logical illustration of the resulting product polygon description 2102 including the resulting island polygon linked list 2116. The product polygon linked list 2112 remains unchanged. FIG. 22 provides an illustration of the resulting product polygon 2202 and the resulting island 2216.

Figure 23:
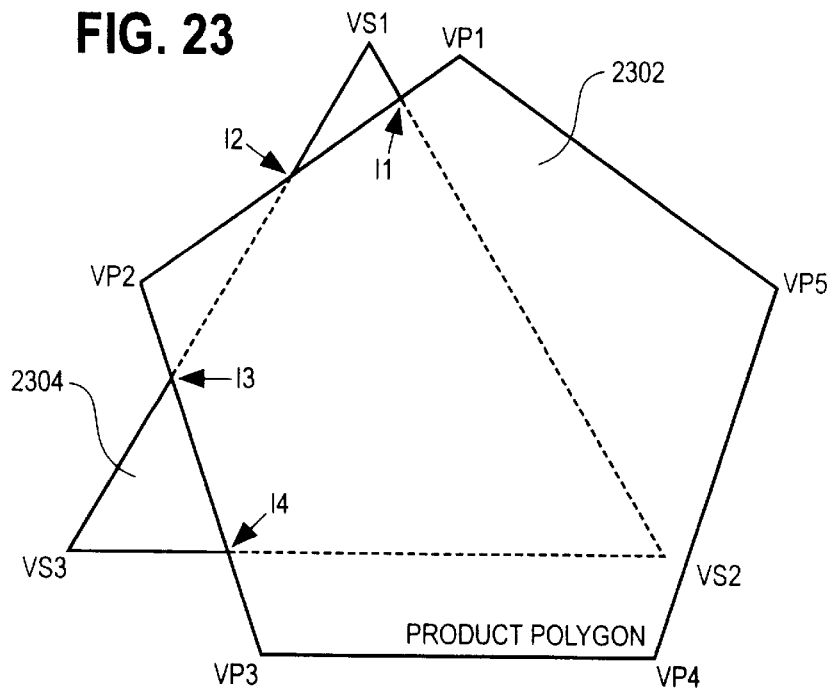
FIG. 23 illustrates a product polygon and a subtracting polygon that intersect, in accordance with methods and systems consistent with the invention.
Figure 24:
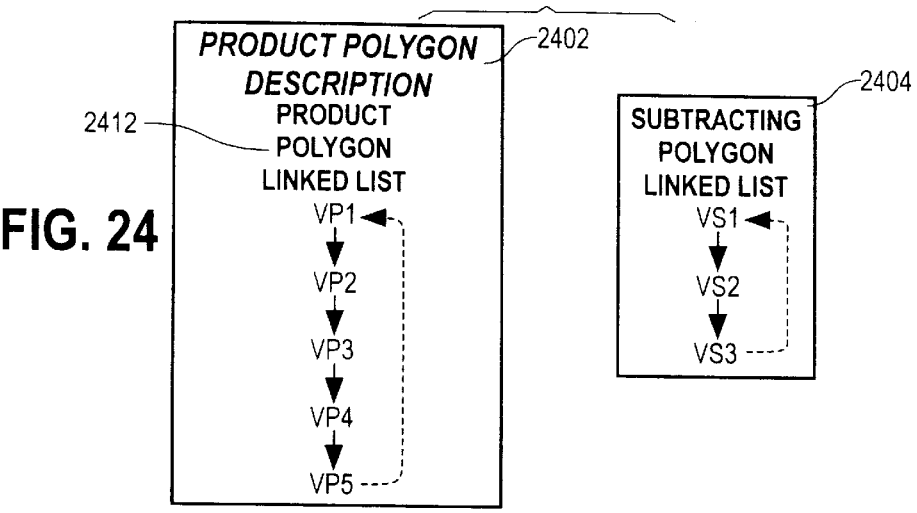
FIG. 24 provides a logical illustration of a product polygon description and a subtracting polygon linked list, in accordance with methods and systems consistent with the invention.
Figure 25:
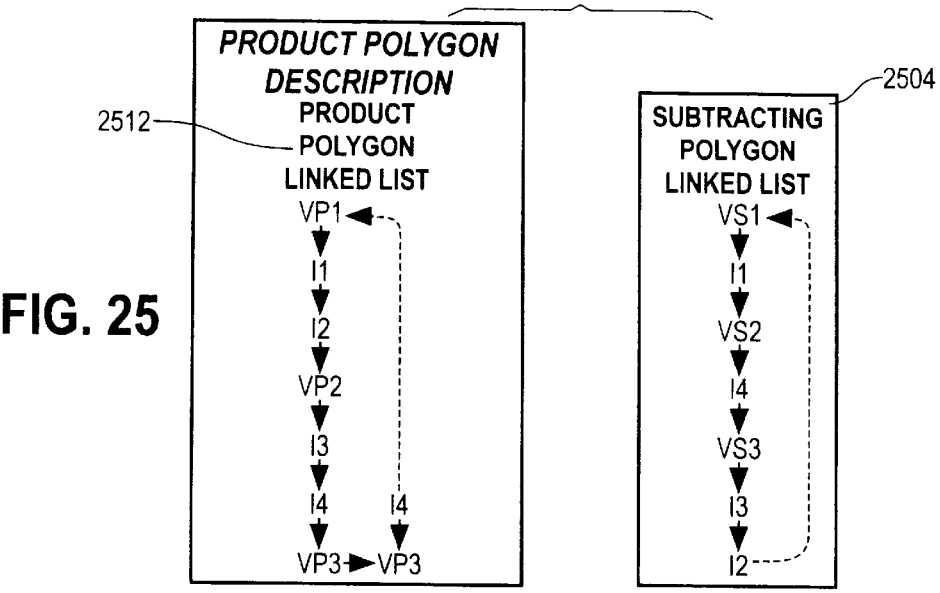
FIG. 25 provides a logical illustration of a product polygon description and a subtracting polygon linked list after intersection nodes are inserted, in accordance with methods and systems consistent with the invention.
Figure 26:
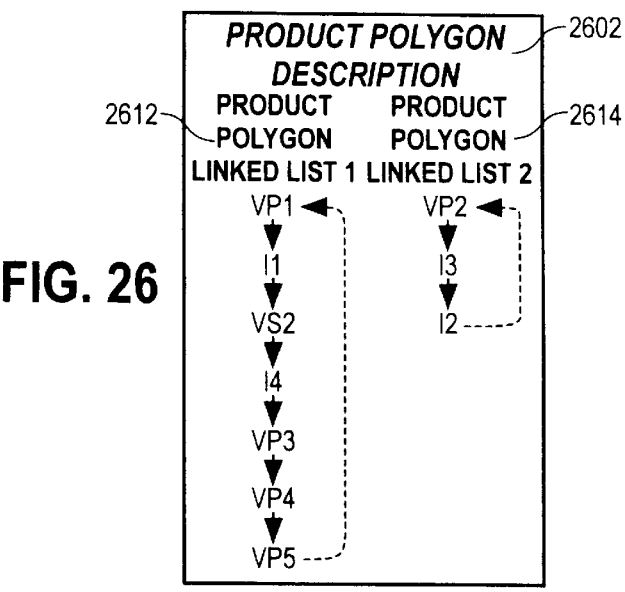
FIG. 26 provides a logical illustration of a product polygon description, in accordance with methods and systems consistent with the invention.
Figure 27:
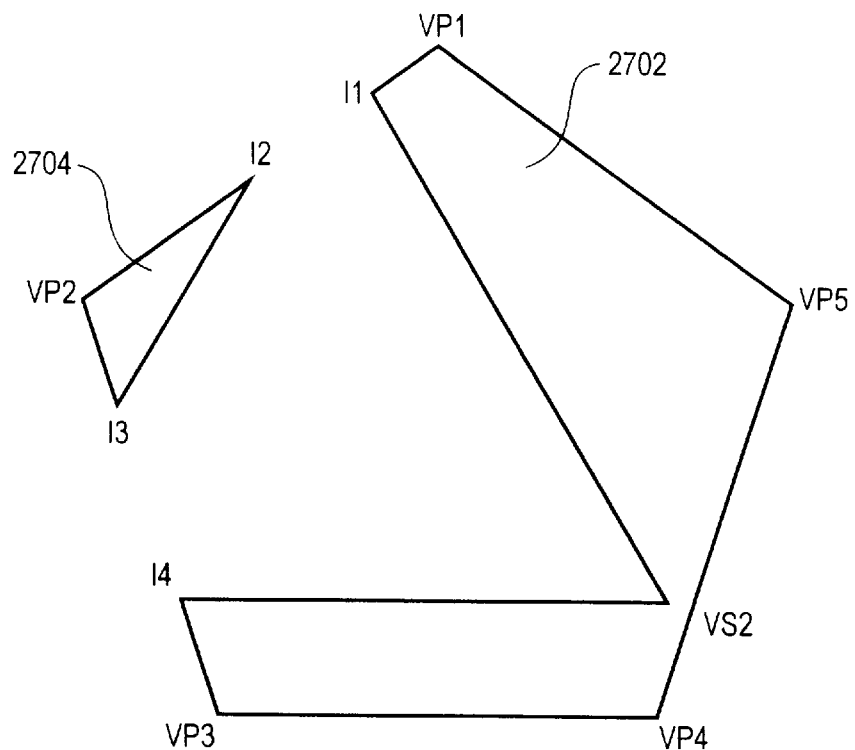
FIG. 27 illustrates two polygons, in accordance with methods and systems consistent with the invention.

FIG. 23 illustrates a product polygon 2302 and a subtracting polygon 2304 that intersect. As illustrated, the subtracting polygon 2304 splits the product polygon 2302 into two separate polygons. FIG. 24 provides a logical illustration of a product polygon description 2402 and a subtracting polygon linked list 2404 for the product polygon 2302 and subtracting polygon 2304, respectively, of FIG. 23. Because the product polygon 2302 doesn't have any islands, the product polygon description only includes a product polygon linked list 2412. The procedure discussed above is followed, and the intersections are inserted into the linked lists. FIG. 25 provides a logical illustration of the resulting product polygon linked list 2512 and subtracting polygon linked list 2504 after the intersection nodes are inserted. The next step is determining the first vertex in the product polygon linked list that is (1) outside the subtracting polygon or an intersection vertex with the subtracting polygon and (2) has not been used already to build a polygon chain (S402). In this case the first vertex meeting this criteria is VP1. The above described procedure illustrated in FIG. 4 is then followed to generate a new linked list. Unlike previous examples, after the first pass through the procedure, there is still a vertex in the original linked list that is both (1) outside the subtracting polygon or an intersection vertex with the subtracting polygon and (2) has not been already used to generate a chain, vertex VP2. Thus the above-described procedures are followed again to generate a new linked list beginning with vertex VP2. Both new linked lists then replace the original product polygon linked list in the product polygon description. FIG. 26 provides a logical illustration of the resulting product polygon description. As illustrated in FIG. 26, the product polygon now includes two product polygon linked lists 2612 and 2614. At this point there are no further vertices that are both (1) outside the subtracting polygon and (2) have not been used already to generate a chain. Thus, the process is terminated. FIG. 27 illustrates the two resulting product polygons 2702 and 2704.

Figure 28:
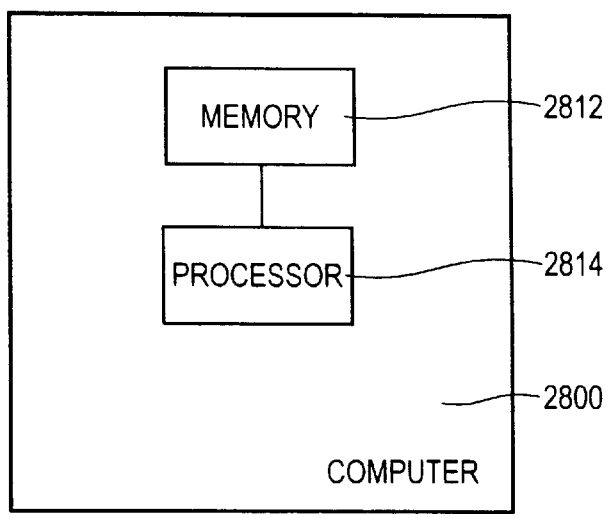
FIG. 28 illustrates a computer, in accordance with methods and systems consistent with the invention.

FIG. 28 illustrates a computer that may be configured to perform the above described procedure. Computer 2800 may include a memory 2812 and a processor 2814. Memory 2812 may store a program for performing the above-described procedures and processor 2814 may execute this program.

Further, as will be obvious to one of skill in the art, the above-described methods and systems are generic and can be applied to numerous other possible combinations of subtracting polygons, product polygons and islands.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed:

1. A method for subtracting a first subtracting polygon from a product polygon, comprising:

determining an intersection of the first subtracting polygon and the product polygon, wherein the first subtracting polygon is represented by a plurality of vertices in a first subtracting polygon linked list and the product polygon is represented by a plurality of vertices in a product polygon linked list;

inserting a first intersection node at the intersection in the product polygon linked list;

inserting a second intersection node at the intersection in the first subtracting polygon linked list;

creating a new linked list by performing the subsets of:

determining a first vertex in the product polygon linked list, adding vertices from the product polygon linked list to the new linked list until the first intersection node is encountered by following the product polygon linked list from the determined first vertex, if an intersection node is encountered, adding vertices from the first subtracting product polygon linked list to the new linked list until a third intersection node is encountered by following the first subtracting polygon linked list from the second intersection node, and repeating the above subsets until returned to the determined first vertex; and replacing the product polygon linked list with the new linked list.

2. The method of claim 1 wherein the vertices in the product polygon linked list have a counter-clockwise orientation and the vertices in the subtracting polygon linked list have a clockwise orientation.

3. The method of claim 1 wherein the substep of determining a first vertex includes determining a vertex in the product polygon linked list that is outside the subtracting polygon.

4. The method of claim 1 further including adding a second subtracting polygon to the product polygon linked list as an island if the second subtracting polygon is wholly contained within the product polygon and does not intersect with another island.

5. An apparatus for subtracting a first subtracting polygon from a product polygon, comprising:

a memory for storing a program for determining an intersection of the first subtracting polygon and the product polygon, wherein the first subtracting polygon is represented by a plurality of vertices in a first subtracting polygon linked list and the product polygon is represented by a plurality of vertices in a product polygon linked list, inserting a first intersection node at the intersection in the product polygon linked list;

inserting a second intersection node at the intersection in the first subtracting polygon linked list;

creating a new linked list by performing the subsets of:

determining a first vertex in the product polygon linked list, adding vertices from the product polygon linked list to the new linked list until the first intersection node is encountered by following the product polygon linked list from the determined first vertex, if an intersection node is encountered, adding vertices from the first subtracting product polygon linked list to the new linked list until a third intersection node is encountered by following the first subtracting polygon linked list from the second intersection node, repeating the above subsets until returned to the determined first vertex, and replacing the product polygon linked list with the new linked list; and a processor for running the program.

6. The apparatus of claim 5 wherein the vertices in the product polygon linked list have a counter-clockwise orientation and the vertices in the subtracting polygon linked list have a clockwise orientation.

7. The apparatus of claim 5 wherein the program's substep of determining a first vertex includes determining a vertex in the product polygon linked list that is outside the subtracting polygon.

8. The apparatus of claim 5 wherein the program is also for adding a second subtracting polygon to the product polygon linked list as an island if the second subtracting polygon is wholly contained within the product polygon and does not intersect with another island.

9. An apparatus for subtracting a first subtracting polygon from a product polygon, comprising:

means for determining an intersection of the first subtracting polygon and the product polygon, wherein the first subtracting polygon is represented by a plurality of vertices in a first subtracting polygon linked list and the product polygon is represented by a plurality of vertices in a product polygon linked list, means for inserting a first intersection node at the intersection in the first subtracting polygon linked list;

means for inserting a second intersection node at the intersection in the product polygon linked list;

means for creating a new linked list including:

means for determining a first vertex in the product polygon linked list, means for adding vertices from the product polygon linked list to the new linked list until the first intersection node is encountered by following the product polygon linked list from the determined first vertex, and means for adding vertices from the first subtracting product polygon linked list to the new linked list until a third intersection node is encountered by following the first subtracting polygon linked list from the second intersection node; and means for replacing the product polygon linked list with the new linked list.

10. The apparatus of claim 9 wherein the vertices stored in the product polygon linked list have a counter-clockwise orientation and the vertices stored in the subtracting polygon linked list have a clockwise orientation.

11. The apparatus of claim 9 wherein the means for determining a first vertex includes means for determining a vertex in the product polygon linked list that is outside the subtracting polygon.

12. The apparatus of claim 9 further including means for adding a second subtracting polygon to the product polygon linked list as an island if the second subtracting polygon is wholly contained within the product polygon and does not intersect with another island.

13. A computer-readable medium whose contents cause a computer system to subtract a first subtracting polygon from a product polygon, by performing the steps of:

determining an intersection of the first subtracting polygon and the product polygon, wherein the first subtracting polygon is represented by a plurality of vertices in a first subtracting polygon linked list and the product polygon is represented by a plurality of vertices in a product polygon linked list;

inserting a first intersection node at the intersection in the product polygon linked list;

inserting a second intersection node at the intersection in the first subtracting polygon linked list;

creating a new linked list by performing the subsets of:

determining a first vertex in the product polygon linked list, adding vertices from the product polygon linked list to the new linked list until the first intersection node is encountered by following the product polygon linked list from the determined first vertex, if an intersection node is encountered, adding vertices from the first subtracting product polygon linked list to the new linked list until a third intersection node is encountered by following the first subtracting polygon linked list from the second intersection node, and repeating the above subsets until returned to the determined first vertex;

replacing the product polygon linked list with the new linked list.

14. The computer-readable medium of claim 13 wherein the vertices in the product polygon linked list have a counter-clockwise orientation and the vertices in the subtracting polygon linked list have a clockwise orientation.

15. The computer-readable medium of claim 13 wherein the substep of determining a first vertex includes determining a vertex in the product polygon linked list that is outside the subtracting polygon.

16. The computer-readable medium of claim 13 where in the contents further cause a computer to perform the step of:

adding a second subtracting polygon to the product polygon linked list as an island if the second subtracting polygon is wholly contained within the product polygon and does not intersect with another island.

* * * * *

UNITED STATES PATENT AND TRADEMARK OFFICE
CERTIFICATE OF CORRECTION

PATENT NO.    : 6,208,352 B1
DATED         : March 27, 2001
INVENTOR(S)   : Bruce Hardy Blackwell It is certified that error appears in the above-identified patent and that said Letters Patent is hereby corrected as shown below:

Please delete the word "polygram" (which appears two times in column 3, line 29) and insert -- polygon --.

Column 6,
Line 35, delete "12" and insert -- I2 --.

Column 7,
Line 52, delete "12" and insert -- I2 --.

Column 8,
Line 11, delete "12" and insert -- I2 --.

Signed and Sealed this

Eleventh Day of September, 2001

*Attest:*

NICHOLAS P. GODICI
*Attesting Officer*   *Acting Director of the United States Patent and Trademark Office*